(12) United States Patent
Tsai et al.

(10) Patent No.: US 12,088,198 B2
(45) Date of Patent: Sep. 10, 2024

(54) POWER CONVERTER AND CONVERTING METHOD WITH LIGHT LOADING STATE CONTROL

(71) Applicant: NOVATEK Microelectronics Corp., Hsinchu (TW)

(72) Inventors: Chieh-Ju Tsai, Kinmen County (TW); Ching-Jan Chen, Taipei (TW); Zhen-Guo Ding, Hsinchu County (TW); Zhe-Hui Lin, Hsinchu County (TW); Wei-Ling Chen, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 218 days.

(21) Appl. No.: 17/646,481

(22) Filed: Dec. 30, 2021

(65) Prior Publication Data

US 2022/0271662 A1 Aug. 25, 2022

Related U.S. Application Data

(60) Provisional application No. 63/152,323, filed on Feb. 22, 2021.

(51) Int. Cl.
 *H02M 3/158* (2006.01)
 *H02M 1/00* (2006.01)
 *H02M 3/157* (2006.01)

(52) U.S. Cl.
 CPC ......... *H02M 3/158* (2013.01); *H02M 1/0025* (2021.05); *H02M 3/157* (2013.01)

(58) Field of Classification Search
 CPC ............ H02M 1/0032; H02M 1/0003; H02M 1/0025; H02M 3/158; H02M 3/156
 See application file for complete search history.

(56) References Cited

U.S. PATENT DOCUMENTS

| 7,245,113 | B2 | 7/2007 | Chen et al. |
| 7,751,471 | B2 | 7/2010 | Chu et al. |
| 9,601,997 | B2 | 3/2017 | Yan et al. |

(Continued)

FOREIGN PATENT DOCUMENTS

| CN | 101789699 A | 7/2010 |
| CN | 102355145 A | 2/2012 |

(Continued)

*Primary Examiner* — Alex Torres-Rivera
(74) *Attorney, Agent, or Firm* — CKC & Partners Co., LLC

(57) ABSTRACT

A power stage circuit generates an output signal according to an input signal and a control signal. A ramp generator circuit generates a ramp signal according to the control signal, the input signal, and the output signal. A calculation circuit generates a calculation signal according to the output signal and a reference signal. The calculation circuit operates in a first mode when the power converter operates in a light loading state, and the calculation circuit operates in a second mode when the power converter operates in a normal state. A control circuit generates the control signal according to the calculation signal and the ramp signal. The control circuit includes a comparator circuit and a control signal generator. The comparator circuit generates a comparison signal according to the calculation signal and the ramp signal. The control signal generator generates the control signal according to the comparison signal.

15 Claims, 10 Drawing Sheets

(56) References Cited

U.S. PATENT DOCUMENTS

| | | | |
|---|---|---|---|
| 10,097,079 B1 | 10/2018 | Cheng et al. | |
| 2010/0007318 A1 | 1/2010 | Faerber | |
| 2013/0038312 A1* | 2/2013 | Wang | H02M 3/1584 |
| | | | 323/288 |
| 2017/0117805 A1* | 4/2017 | Hane | H02M 3/156 |
| 2018/0183331 A1* | 6/2018 | Chen | H02M 3/158 |
| 2019/0260284 A1 | 8/2019 | Liu | |
| 2020/0119642 A1 | 4/2020 | Zhang | |
| 2021/0083579 A1* | 3/2021 | Hsu | H03K 7/08 |

FOREIGN PATENT DOCUMENTS

| | | |
|---|---|---|
| EP | 0709948 A1 | 5/1996 |
| EP | 2985900 A1 | 2/2016 |
| TW | 201044762 A | 12/2010 |
| TW | 201503560 A | 1/2015 |
| TW | I547083 B | 8/2016 |
| TW | 202103423 A | 1/2021 |

\* cited by examiner

POWER CONVERTER AND CONVERTING METHOD WITH LIGHT LOADING STATE CONTROL

RELATED APPLICATIONS

This application claims priority to U.S. Provisional Application Ser. No. 63/152,323, filed Feb. 22, 2021, which is herein incorporated by reference.

BACKGROUND

Technical Field

The present disclosure relates to power converting technology. More particularly, the present disclosure relates to a power converter and a converting method.

Description of Related Art

With development of technology, various power converters have been applied to various circuitries. In some related approaches, a power converter includes an additional switching circuit, and the additional switching circuit is designed to switch to an additional circuit with low power consumption when the power converter operates in a light loading state. However, the additional switching circuit and the additional circuit with low power consumption increase circuit cost and circuit size.

SUMMARY

Some aspects of the present disclosure are to provide a power converter. The power converter includes a power stage circuit, a ramp generator circuit, a calculation circuit, and a control circuit. The power stage circuit is configured to generate an output signal according to an input signal and a control signal. The ramp generator circuit is configured to generate a ramp signal according to the control signal, the input signal, and the output signal. The calculation circuit is configured to generate a calculation signal according to the output signal and a reference signal, in which the calculation circuit operates in a first mode when the power converter operates in a light loading state, and the calculation circuit operates in a second mode when the power converter operates in a normal state. The control circuit is configured to generate the control signal according to the calculation signal and the ramp signal. The control circuit includes a comparator circuit and a control signal generator. The comparator circuit is configured to generate a comparison signal according to the calculation signal and the ramp signal. The control signal generator is configured to generate the control signal according to the comparison signal.

Some aspects of the present disclosure are to provide a converting method. The converting method includes following operations: generating, by a power stage circuit, an output signal according to an input signal and a control signal; generating, by a ramp generator circuit, a ramp signal according to the control signal, the input signal, and the output signal; generating, by a calculation circuit, a calculation signal according to the output signal and a reference signal, in which the calculation circuit operates in a first mode when a power converter operates in a light loading state, and the calculation circuit operates in a second mode when the power converter operates in a normal state; and generating, by a control circuit, the control signal according to the calculation signal and the ramp signal. The operation of generating, by the control circuit, the control signal according to the calculation signal and the ramp signal includes following operations: generating, by a comparator circuit of the control circuit, a comparison signal according to the calculation signal and the ramp signal; and generating, by a control signal generator of the control circuit, the control signal according to the comparison signal.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
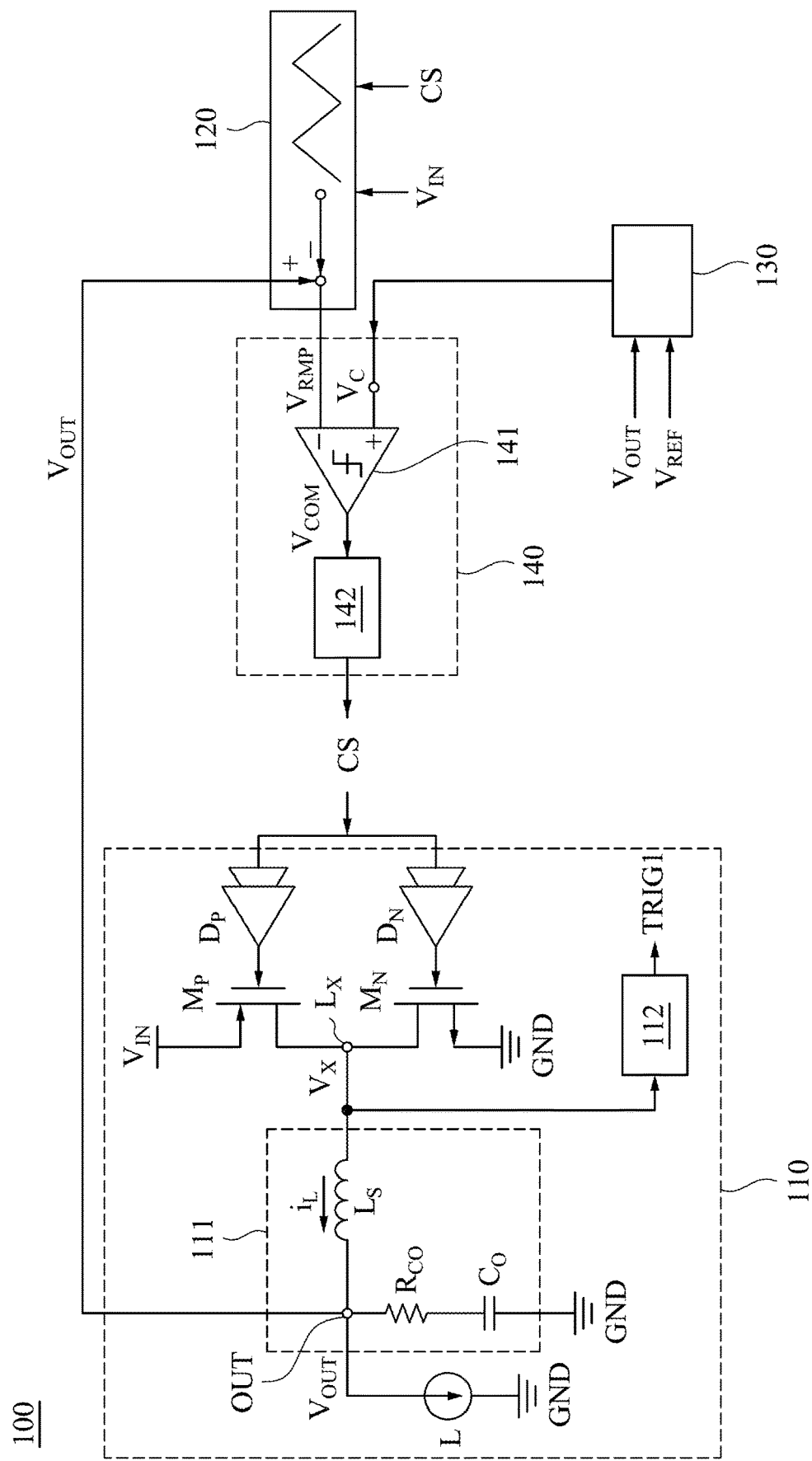
FIG. 1 is a schematic diagram illustrating a power converter according to some embodiments of the present disclosure.

Reference is made to FIG. 1. FIG. 1 is a schematic diagram illustrating a power converter 100 according to some embodiments of the present disclosure.

As illustrated in FIG. 1, the power converter 100 includes a power stage circuit 110, a ramp generator circuit 120, a calculation circuit 130, and a control circuit 140. The power stage circuit 110 is coupled to the ramp generator circuit 120 and the calculation circuit 130. The ramp generator circuit 120 and the calculation circuit 130 are coupled to the control circuit 140. The control circuit 140 is coupled to the power stage circuit 110.

The power stage circuit 110 is configured to generate an output signal $V_{OUT}$ according to an input signal $V_{IN}$ and a control signal CS from the control circuit 140. The control signal CS may be a pulse width modulation (PWM) signal. The output signal $V_{OUT}$ is substantially equal to a product of the input signal $V_{IN}$ and the duty cycle (e.g., various percentage values) of the control signal CS. For example, when the duty cycle of the control signal CS is 30%, the output signal $V_{OUT}$ is substantially equal to a product of the input signal $V_{IN}$ and 30%.

As illustrated in FIG. 1, the power stage circuit 110 includes a switch $M_P$, a switch $M_N$, a driver $D_P$, a driver $D_N$, and a filter circuit 111. In some embodiments, the power stage circuit 110 further includes a detector 112.

The switch $M_P$ receives the input signal $V_{IN}$ and is coupled to a node $L_X$. The switch $M_N$ is coupled between the node $L_X$ and a ground terminal GND. The driver $D_P$ receives the control signal CS and is configured to turn on or turn off the switch $M_P$ according to the control signal CS. The driver $D_N$ receives the control signal CS and is configured to turn on or turn off the switch $M_N$ according to the control signal CS. When the switch $M_P$ is turned on and the switch $M_N$ is turned off, a voltage $V_X$ at the node $L_X$ is generated in response to the input signal $V_{IN}$. When the switch $M_P$ is turned off and the switch $M_N$ is turned on, the voltage $V_X$ at the node $L_X$ is generated in response to a ground voltage at the ground terminal GND.

The filter circuit 111 includes an inductor $L_S$, a resistor $R_{Co}$, and a capacitor $C_O$. A current $i_L$ flows through the inductor $L_S$ in response to the voltage $V_X$ at the node $L_X$, and the output signal $V_{OUT}$ is generated at an output terminal OUT. A load L is coupled to the output terminal OUT.

The detector 112 is configured to detect a current associated with the voltage $V_X$ at the node $L_X$ to generate a trigger signal TRIG1. The detector 112 can be implemented by a zero-crossing detector (ZCD).

The ramp generator circuit 120 is configured to generate a ramp signal $V_{RMP}$ according to the control signal CS, the input signal $V_{IN}$, and the output signal $V_{OUT}$. To be more specific, the ramp generator circuit 120 generates a triangle wave according to the control signal CS and the input signal $V_{IN}$, and sums up of the triangle wave and the output signal $V_{OUT}$ to generate the ramp signal $V_{RMP}$. The ramp signal $V_{RMP}$ is transmitted to the control circuit 140.

The calculation circuit 130 is configured to generate a calculation signal $V_C$ according to the output signal $V_{OUT}$ and a reference signal $V_{REF}$. The calculation signal $V_C$ is transmitted to the control circuit 140. When the power converter 100 operates in a normal state, the calculation circuit 130 operates in the Inductor Current Continuous-Time Conduction Mode (CCM). When the power converter 100 operates in a light loading state, the calculation circuit 130 operates in the Inductor Current Discontinuous-Time Conduction Mode (DCM). Compared to the CCM, the DCM is a power-saving mode. In other words, the calculation circuit 130 can be switched between the non-power-saving mode and the power-saving mode. In some embodiments, the mode of the calculation circuit 130 changed by the trigger signal TRIG1 from the detector 112. In some embodiments, the mode of the calculation circuit 130 changed by a trigger signal TRIG2 (e.g., the trigger signal TRIG2 in FIG. 4).

The implementations of the ramp generator circuit 120 and the calculation circuit 130 are described in following paragraphs.

The control circuit 140 is configured to generate the control signal CS according to the ramp signal $V_{RMP}$ from the ramp generator circuit 120 and the calculation signal $V_C$ from the calculation circuit 130. As illustrated in FIG. 1, the control circuit 140 includes a comparator circuit 141 and a control signal generator 142. A first input terminal of the comparator circuit 141 receives the ramp signal $V_{RMP}$, and a second input terminal of the comparator circuit 141 receives the calculation signal $V_C$. The comparator circuit 141 generates a comparison signal $V_{COM}$ according to the ramp signal $V_{RMP}$ and the calculation signal $V_C$. To be more specific, the comparator circuit 141 compares the calculation signal $V_C$ with the ramp signal $V_{RMP}$. When the calculation signal $V_C$ is greater than the ramp signal $V_{RMP}$, the comparator circuit 141 outputs the comparison signal $V_{COM}$ (e.g., with a logic value 1) to drive the control signal generator 142. The control signal generator 142 generates the control signal CS according to the comparison signal $V_{COM}$, and the control signal CS is transmitted to the power stage circuit 110. In some embodiments, the control signal generator 142 includes an on-time controller and an AND gate. The on-time controller generates an on-time control signal according to the comparison signal $V_{COM}$, and the AND gate outputs the control signal CS according to the comparison signal $V_{COM}$ and the on-time control signal.

Figure 2:
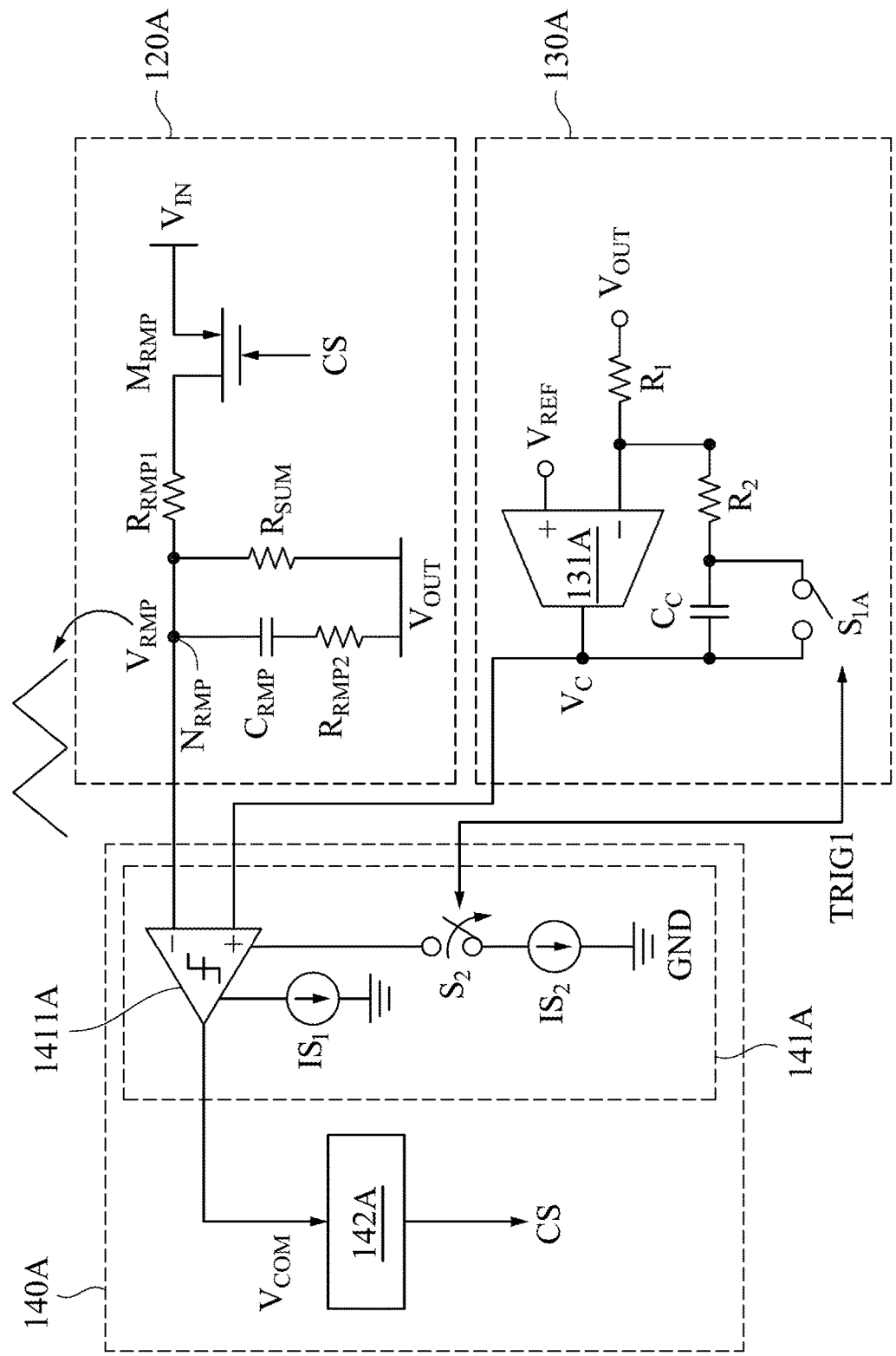
FIG. 2 is a schematic diagram illustrating a ramp generator circuit, a calculation circuit, and a control circuit according to some embodiments of the present disclosure.

Reference is made to FIG. 2. FIG. 2 is a schematic diagram illustrating a ramp generator circuit 120A, a calculation circuit 130A, and a control circuit 140A according to some embodiments of the present disclosure.

In some embodiments, the ramp generator circuit 120 in FIG. 1 is implemented by the ramp generator circuit 120A, the calculation circuit 130 in FIG. 1 is implemented by the calculation circuit 130A, and the control circuit 140 in FIG. 1 is implemented by the control circuit 140A.

As illustrated in FIG. 2, the ramp generator circuit 120A includes a switch $M_{RMP}$, a resistor $R_{RMP1}$, a resistor $R_{SUM}$, a capacitor $C_{RMP}$, and a resistor $R_{RMP2}$. The switch $M_{RMP}$ receives the input signal $V_{IN}$ and is controlled by the control signal CS. The resistor $R_{RMP1}$ is coupled to the switch $M_{RMP}$ and a ramp node $N_{RMP}$. The resistor $R_{SUM}$ is coupled to the ramp node $N_{RMP}$ and receives the output signal $V_{OUT}$. The resistor $R_{RMP2}$ is coupled to the capacitor $C_{RMP}$ in series and receives the output signal $V_{OUT}$. The capacitor $C_{RMP}$ is coupled to the ramp node $N_{RMP}$. The ramp signal $V_{RMP}$ is generated at the ramp node $N_{RMP}$.

The calculation circuit 130A includes an error amplifier 131A, a resistor $R_1$, a resistor $R_2$, a capacitor $C_C$, and a switch $S_{1A}$. A first input terminal of the error amplifier 131A receives the reference signal $V_{REF}$, and a second input terminal of the error amplifier 131A receives the output signal $V_{OUT}$ via the resistor $R_1$. The resistor $R_2$ is coupled to the second input terminal of the error amplifier 131A. The capacitor $C_C$ and the resistor $R_2$ are connected in series, and the capacitor $C_C$ is coupled between the resistor $R_2$ and an output terminal of the error amplifier 131A. The switch $S_{1A}$ is coupled to the capacitor $C_C$ in parallel. The switch $S_{1A}$ is controlled by the trigger signal TRIG1 from the detector 112 in FIG. 1. For example, when the power converter 100 operates in the light loading state, the detector 112 detects a zero-current event associated to the voltage $V_X$ at the node $L_X$ and then the detector 112 outputs the trigger signal TRIG1 (e.g., with a logic value 1) to turn on the switch $S_{1A}$. The turned-on switch $S_{1A}$ can short two terminals of the capacitor $C_C$, and the calculation circuit 130A enters into the power-saving mode (e.g., Inductor Current Discontinuous-Time Conduction Mode). When the power converter 100 operates in the normal state, the detector 112 does not detect the zero-current event and then the detector 112 outputs the trigger signal TRIG1 (e.g., with a logic value 0) to turn off the switch $S_{1A}$, and the calculation circuit 130A enters into the non-power-saving mode (e.g., Inductor Current Continuous-Time Conduction Mode).

The comparator circuit 141 in the control circuit 140A includes a comparator 1411A, a current source $IS_1$, a current source $IS_2$, and a switch $S_2$. The comparator 1411A receives the ramp signal $V_{RMP}$ from the ramp generator circuit 120A and the calculation signal $V_C$ from the calculation circuit 130A. The current source $IS_1$ is coupled between the comparator 1411A and the ground terminal GND. The switch $S_2$ is coupled between the comparator 1411A and the current source $IS_2$. The current source $IS_2$ is coupled to the ground terminal GND. The switch $S_2$ is controlled by the trigger signal TRIG1 from the detector 112 in FIG. 1. For example, when the power converter operates in the light loading state, the detector 112 detects the zero-current event associated to the voltage $V_X$ at the node $L_X$ and then the detector 112 outputs the trigger signal TRIG1 (e.g., with the logic value 1) to turn off the switch $S_2$. Since the switch $S_2$ is turned off, the current source $IS_2$ does not supply power to the comparator 1411A such that power can be saved. When the power converter 100 operates in the normal state, the detector 112 does not detect the zero-current event and then the detector 112 outputs the trigger signal TRIG1 (e.g., with a logic value 0) to turn on the switch $S_2$. The comparator circuit 141A generates the comparison signal $V_{COM}$, and the control signal generator 142A in the control circuit 140A generates the control signal CS according to the comparison signal $V_{COM}$.

In some related approaches, a power converter includes an additional switching circuit. The additional switching circuit is designed to switch to an additional circuit with low power consumption when the power converter operates in a light loading state. However, the additional switching circuit and the additional circuit with low power consumption increase circuit cost and circuit size.

Compared to some approaches, in the present disclosure, the calculation circuit 130A can operate in two different modes without the aforementioned additional switching circuit. The power converter 100 can utilize the calculation circuit 130A to realize a seamless transition between the power-saving mode (e.g., Inductor Current Discontinuous-Time Conduction Mode) and the non-power-saving mode (e.g., Inductor Current Continuous-Time Conduction Mode). For example, since the switch $S_{1A}$ can short two terminals of the capacitor $C_C$ in the power-saving mode, the voltage value of the calculation signal $V_C$ does not drop so much. In this situation, when the load L changes and when the power converter 100 intends to enter the non-power-saving mode, the calculation signal $V_C$ can be charged to a voltage value of the ramp signal $V_{RMP}$ rapidly. Thus, the present disclosure can realize the fast seamless transition without the aforementioned additional switching circuit to reduce the circuit cost and the circuit size.

Figure 3:
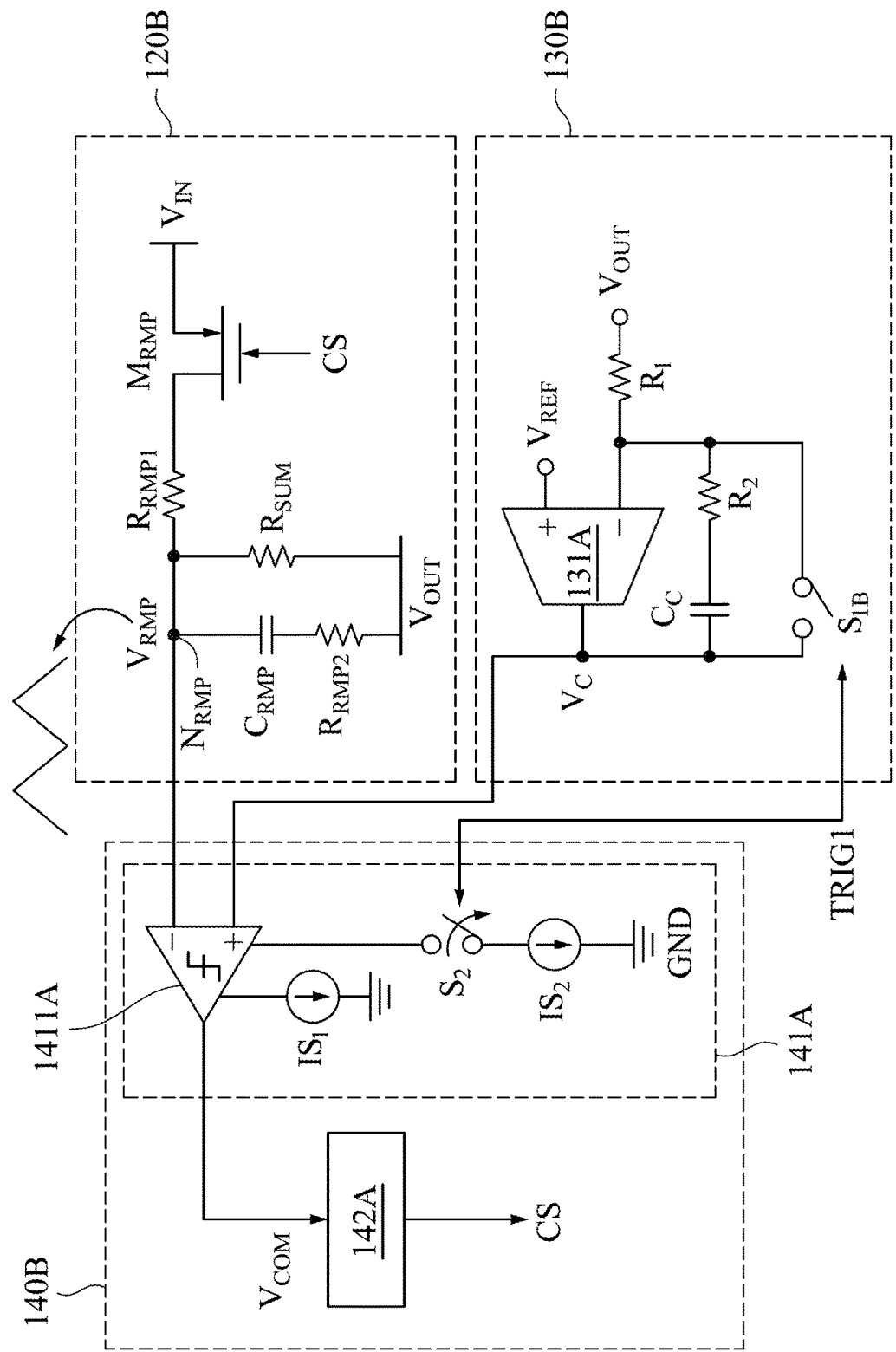
FIG. 3 is a schematic diagram illustrating a ramp generator circuit, a calculation circuit, and a control circuit according to some embodiments of the present disclosure.

Reference is made to FIG. 3. FIG. 3 is a schematic diagram illustrating a ramp generator circuit 120B, a calculation circuit 130B, and a control circuit 140B according to some embodiments of the present disclosure.

In some embodiments, the ramp generator circuit 120 in FIG. 1 is implemented by the ramp generator circuit 120B, the calculation circuit 130 in FIG. 1 is implemented by the calculation circuit 130B, and the control circuit 140 in FIG. 1 is implemented by the control circuit 140B.

The ramp generator circuit 120B is similar to the ramp generator circuit 120A in FIG. 2, and the control circuit 140B is similar to the control circuit 140A in FIG. 2.

One of major differences between FIG. 3 and FIG. 2 is that the capacitor $C_C$ and the resistor $R_2$ are connected in series, formed a resistor-capacitor circuit (RC circuit), and a switch $S_{1B}$ in the calculation circuit 130B is coupled to the RC circuit in parallel. When the power converter 100 operates in the light loading state, the detector 112 detects the zero-current event associated to the voltage $V_X$ at the node $L_X$ and then the detector 112 outputs the trigger signal TRIG1 (e.g., with a logic value 1) to turn on the switch $S_{1B}$. The turned switch $S_{1B}$ can short two terminals of the RC circuit (i.e., the capacitor $C_C$ and the resistor $R_2$ connected in series), and the calculation circuit 130B enters into the power-saving mode (e.g., Inductor Current Discontinuous-Time Conduction Mode). When the power converter 100 operates in the normal state, the detector 112 does not detect the zero-current event and then the detector 112 outputs the trigger signal TRIG1 (e.g., with a logic value 0) to turn off the switch $S_{1B}$. The calculation circuit 130B enters into the non-power-saving mode (e.g., Inductor Current Continuous-Time Conduction Mode).

The function of the switch $S_{1B}$ is similar to that of the switch $S_{1A}$ in FIG. 2, so it is not described herein again.

Figure 4:
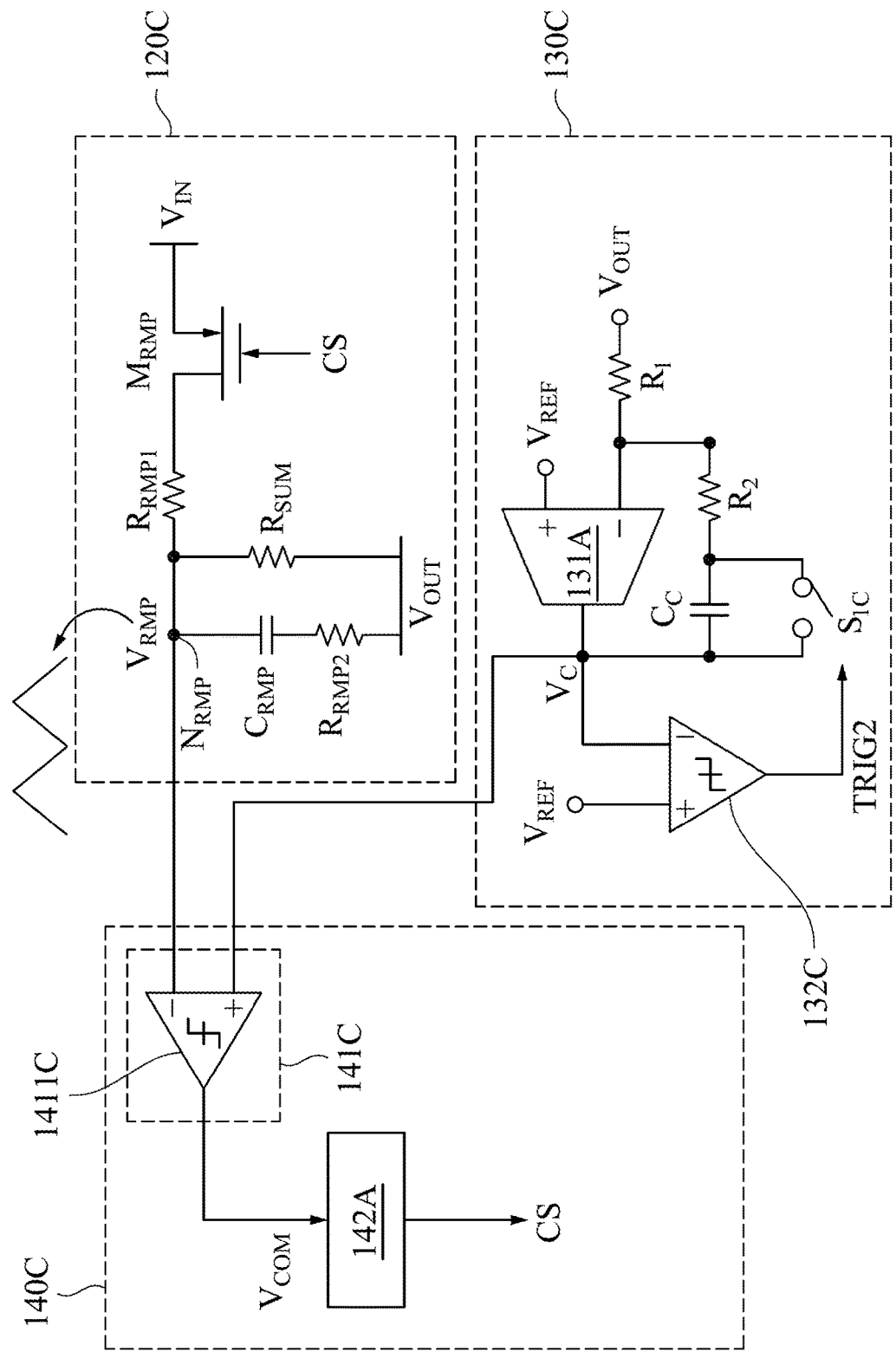
FIG. 4 is a schematic diagram illustrating a ramp generator circuit, a calculation circuit, and a control circuit according to some embodiments of the present disclosure.

Reference is made to FIG. 4. FIG. 4 is a schematic diagram illustrating a ramp generator circuit 120C, a calculation circuit 130C, and a control circuit 140C according to some embodiments of the present disclosure.

In some embodiments, the ramp generator circuit 120 in FIG. 1 is implemented by the ramp generator circuit 120C, the calculation circuit 130 in FIG. 1 is implemented by the calculation circuit 130C, and the control circuit 140 in FIG. 1 is implemented by the control circuit 140C.

The ramp generator circuit 120C is similar to the ramp generator circuit 120A in FIG. 2.

One of major differences between FIG. 4 and FIG. 2 is that the calculation circuit 130C further includes a comparator 132C. The comparator 132C compares the calculation signal $V_C$ with the reference signal $V_{REF}$ to generate a trigger signal TRIG2. A switch $S_{1C}$ coupled to the capacitor $C_C$ in parallel and is controlled by the trigger signal TRIG2. For example, when the power converter 100 operates in the light loading state, the calculation signal $V_C$ is less than the reference signal $V_{REF}$ and the comparator 132C outputs the trigger signal TRIG2 (e.g., with a logic value 1) to turn on the switch $S_{1C}$. The turned-on switch $S_{1C}$ can short two terminals of the capacitor $C_C$, and the calculation circuit 130C enters into the power-saving mode (e.g., Inductor Current Discontinuous-Time Conduction Mode). When the power converter 100 operates in the normal state, the calculation signal $V_C$ is equal to or greater than the reference signal $V_{REF}$ and the comparator 132C outputs the trigger signal TRIG2 (e.g., with a logic value 0) to turn off the switch $S_{1C}$. The calculation circuit 130C enters into the non-power-saving mode (e.g., Inductor Current Continuous-Time Conduction Mode).

The function of the switch $S_{1C}$ is similar to that of the switch $S_{1A}$ in FIG. 2, so it is not described herein again.

In addition, another of major differences between FIG. 4 and FIG. 2 is that a comparator circuit 141C merely includes a comparator 1411C. The comparator circuit 141C operates without the current source $IS_1$, the current source $IS_2$, and the switch $S_2$ in FIG. 2 to output the comparison signal $V_{COM}$.

Figure 5:
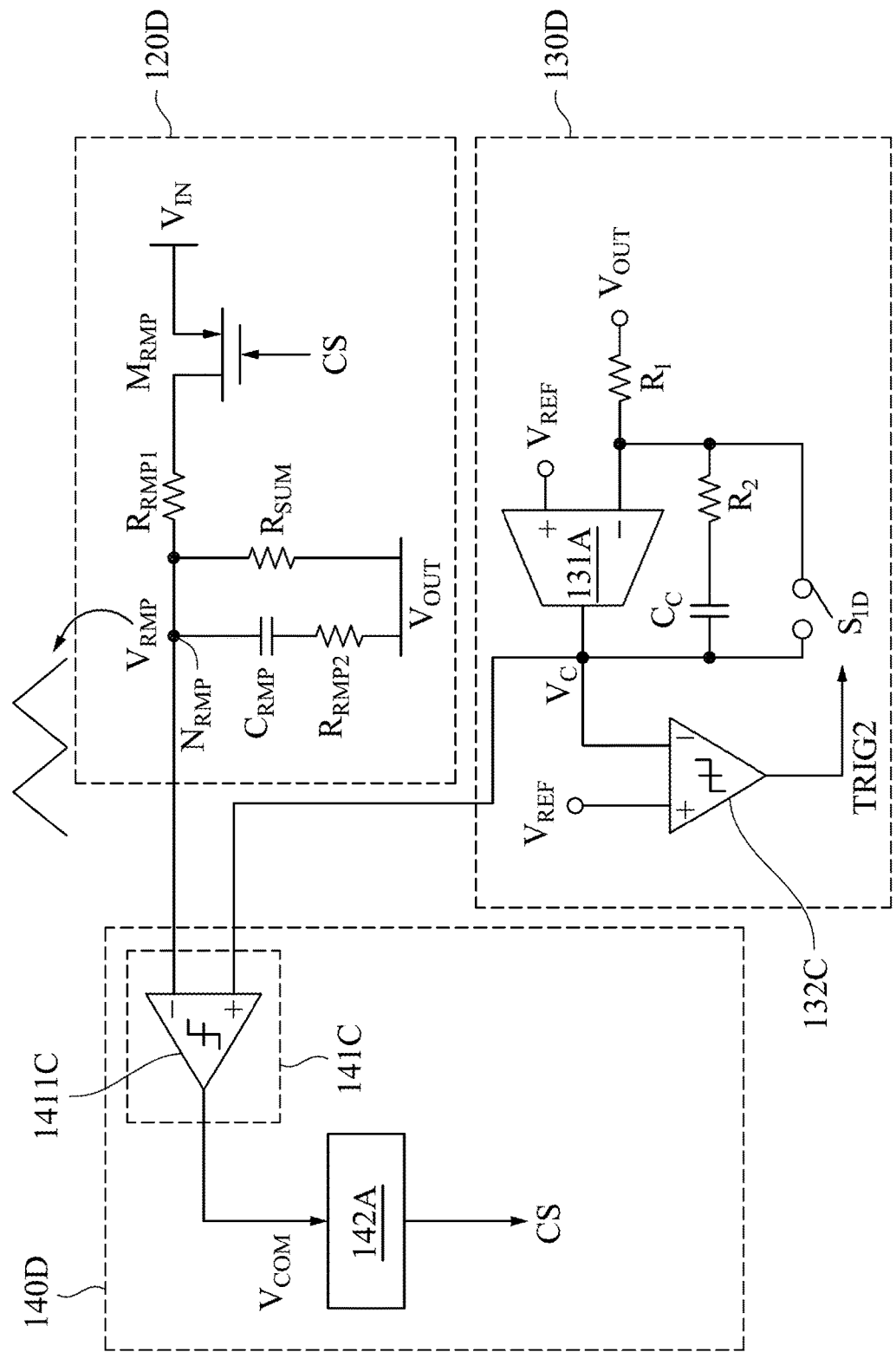
FIG. 5 is a schematic diagram illustrating a ramp generator circuit, a calculation circuit, and a control circuit according to some embodiments of the present disclosure.

Reference is made to FIG. 5. FIG. 5 is a schematic diagram illustrating a ramp generator circuit 120D, a calculation circuit 130D, and a control circuit 140D according to some embodiments of the present disclosure.

In some embodiments, the ramp generator circuit 120 in FIG. 1 is implemented by the ramp generator circuit 120D, the calculation circuit 130 in FIG. 1 is implemented by the calculation circuit 130D, and the control circuit 140 in FIG. 1 is implemented by the control circuit 140D.

The ramp generator circuit 120D is similar to the ramp generator circuit 120C in FIG. 4, and the control circuit 140D is similar to the control circuit 140C in FIG. 4.

One of major differences between FIG. 5 and FIG. 4 is that the capacitor $C_C$ and the resistor $R_2$ are connected in series, formed a resistor-capacitor circuit (RC circuit), and a switch $S_{1D}$ in the calculation circuit 130D is coupled to the RC circuit in parallel. When the calculation signal $V_C$ is less than the reference signal $V_{REF}$ and the comparator 132C outputs the trigger signal TRIG2 (e.g., with a logic value 1) to turn on the switch $S_{1D}$. The turned switch $S_{1D}$ can short two terminals of the RC circuit (i.e., the capacitor $C_C$ and the resistor $R_2$ connected in series), and the calculation circuit 130D enters into the power-saving mode (e.g., Inductor Current Discontinuous-Time Conduction Mode). When the power converter 100 operates in the normal state, the calculation signal $V_C$ is equal to or greater than the reference signal $V_{REF}$ and the comparator 132C outputs the trigger signal TRIG2 (e.g., with a logic value 0) to turn off the switch $S_{1D}$. The calculation circuit 130D enters into the non-power-saving mode (e.g., Inductor Current Continuous-Time Conduction Mode).

The function of the switch $S_{1D}$ is similar to that of the switch $S_{1B}$ in FIG. 3, so it is not described herein again.

Figure 6:
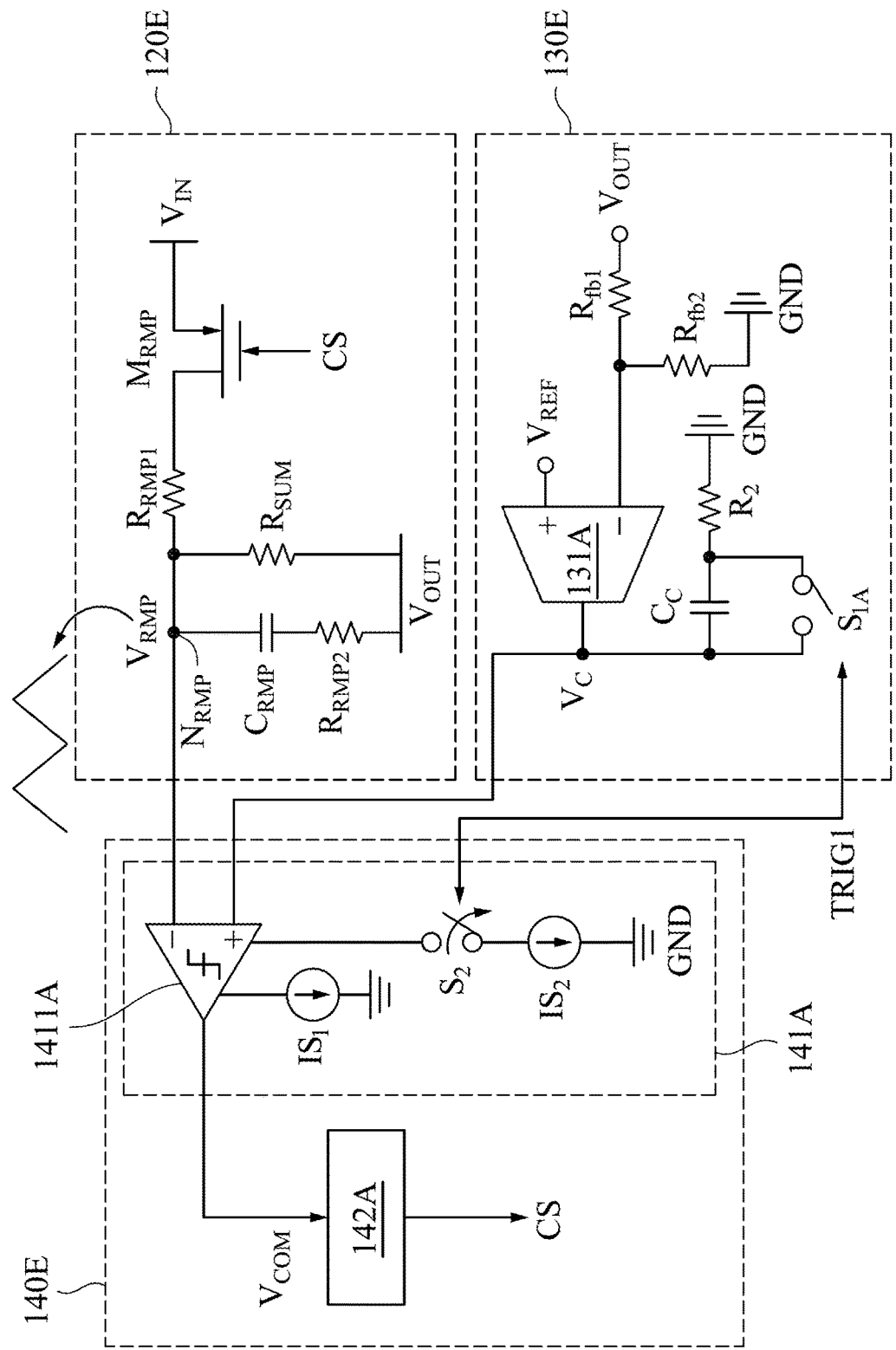
FIG. 6 is a schematic diagram illustrating a ramp generator circuit, a calculation circuit, and a control circuit according to some embodiments of the present disclosure.

Reference is made to FIG. 6. FIG. 6 is a schematic diagram illustrating a ramp generator circuit 120E, a calculation circuit 130E, and a control circuit 140E according to some embodiments of the present disclosure.

In some embodiments, the ramp generator circuit 120 in FIG. 1 is implemented by the ramp generator circuit 120E, the calculation circuit 130 in FIG. 1 is implemented by the calculation circuit 130E, and the control circuit 140 in FIG. 1 is implemented by the control circuit 140E.

The ramp generator circuit 120E is similar to the ramp generator circuit 120A in FIG. 2, and the control circuit 140E is similar to the control circuit 140A in FIG. 2.

The calculation circuit 130E is similar to the calculation circuit 130A in FIG. 2. One of major differences between FIG. 6 and FIG. 2 is that the calculation circuit 130E further includes a resistor $R_{fb1}$ and a resistor $R_{fb2}$. The resistor $R_{fb1}$ replaces the resistor $R_1$ in FIG. 2. In other words, the resistor $R_{fb1}$ is coupled to the second input terminal of the error amplifier 131A, and the error amplifier 131A receives the output signal $V_{OUT}$ through the resistor $R_{fb1}$. The resistor $R_{fb2}$ is coupled between the second input terminal of the error amplifier 131A and the ground terminal GND. The resistor $R_{fb1}$ and the resistor $R_{fb2}$ form a voltage divider circuit. By designing the resistances of the resistor $R_{fb1}$ and the resistor $R_{fb2}$, the voltage inputted into the second input terminal of the error amplifier 131A can be changed. For example, the voltage inputted into the second input terminal of the error amplifier 131A can be adjusted to be less than the output signal $V_{OUT}$ such that the error amplifier 131A receives a lower voltage.

In addition, another of major differences between FIG. 6 and FIG. 2 is that the resistor $R_2$ in FIG. 6 is coupled between the ground terminal GND and the capacitor $C_C$.

Figure 7:
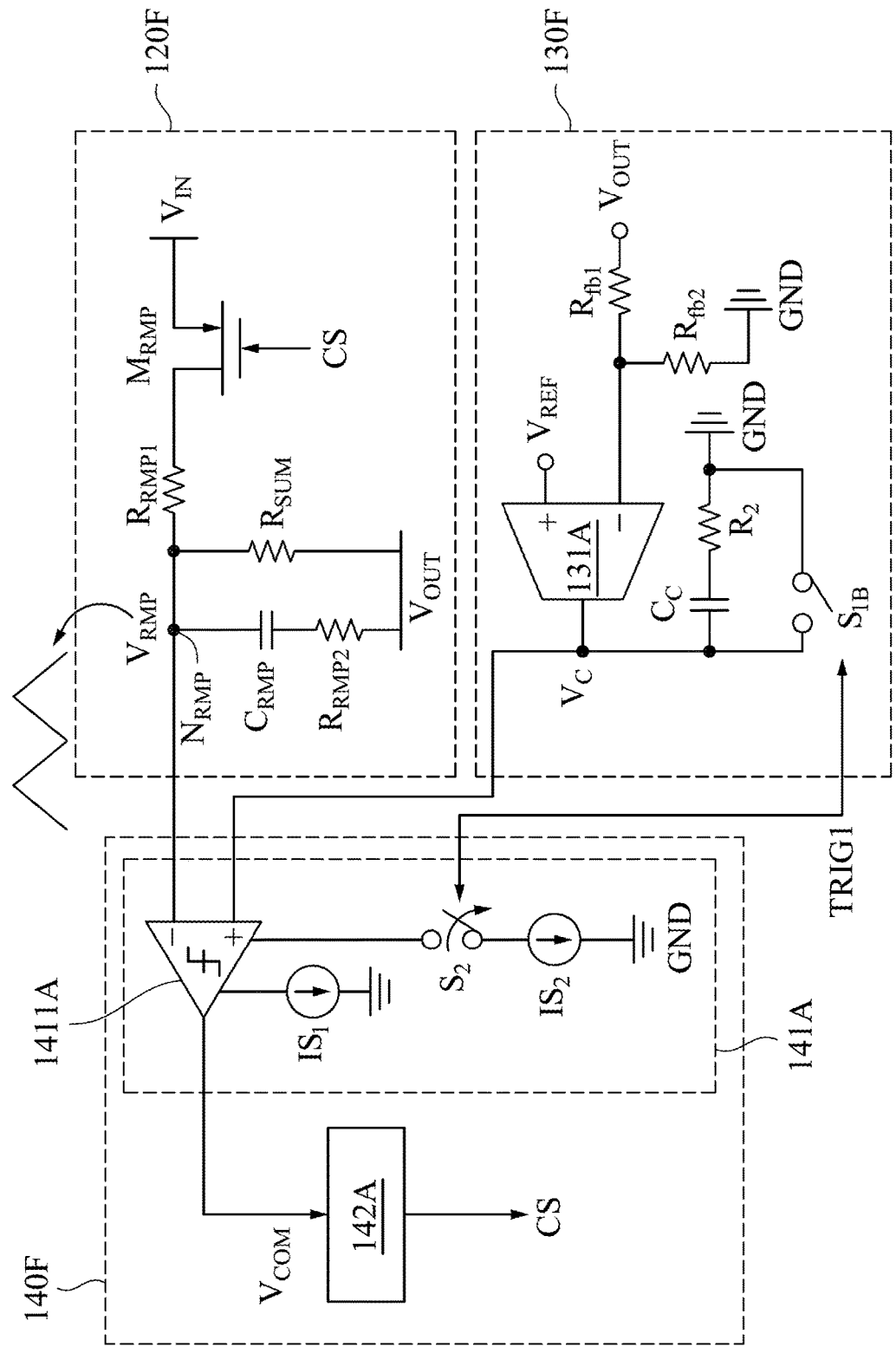
FIG. 7 is a schematic diagram illustrating a ramp generator circuit, a calculation circuit, and a control circuit according to some embodiments of the present disclosure.

Reference is made to FIG. 7. FIG. 7 is a schematic diagram illustrating a ramp generator circuit 120F, a calculation circuit 130F, and a control circuit 140F according to some embodiments of the present disclosure.

In some embodiments, the ramp generator circuit 120 in FIG. 1 is implemented by the ramp generator circuit 120F, the calculation circuit 130 in FIG. 1 is implemented by the calculation circuit 130F, and the control circuit 140 in FIG. 1 is implemented by the control circuit 140F.

The ramp generator circuit 120F is similar to the ramp generator circuit 120B in FIG. 3, and the control circuit 140F is similar to the control circuit 140B in FIG. 3.

The calculation circuit 130F is similar to the calculation circuit 130B in FIG. 3. One of major differences between FIG. 7 and FIG. 3 is that the calculation circuit 130F further includes a resistor $R_{fb1}$ and a resistor $R_{fb2}$. The resistor $R_{fb1}$ replaces the resistor $R_1$ in FIG. 3. In other words, the resistor $R_{fb1}$ is coupled to the second input terminal of the error amplifier 131A, and the error amplifier 131A receives the output signal $V_{OUT}$ through the resistor $R_{fb1}$. The resistor $R_{fb2}$ is coupled between the second input terminal of the error amplifier 131A and the ground terminal GND. In addition, another of major differences between FIG. 7 and FIG. 3 is that the resistor $R_2$ in FIG. 7 is coupled between the ground terminal GND and the capacitor $C_C$.

Figure 8:
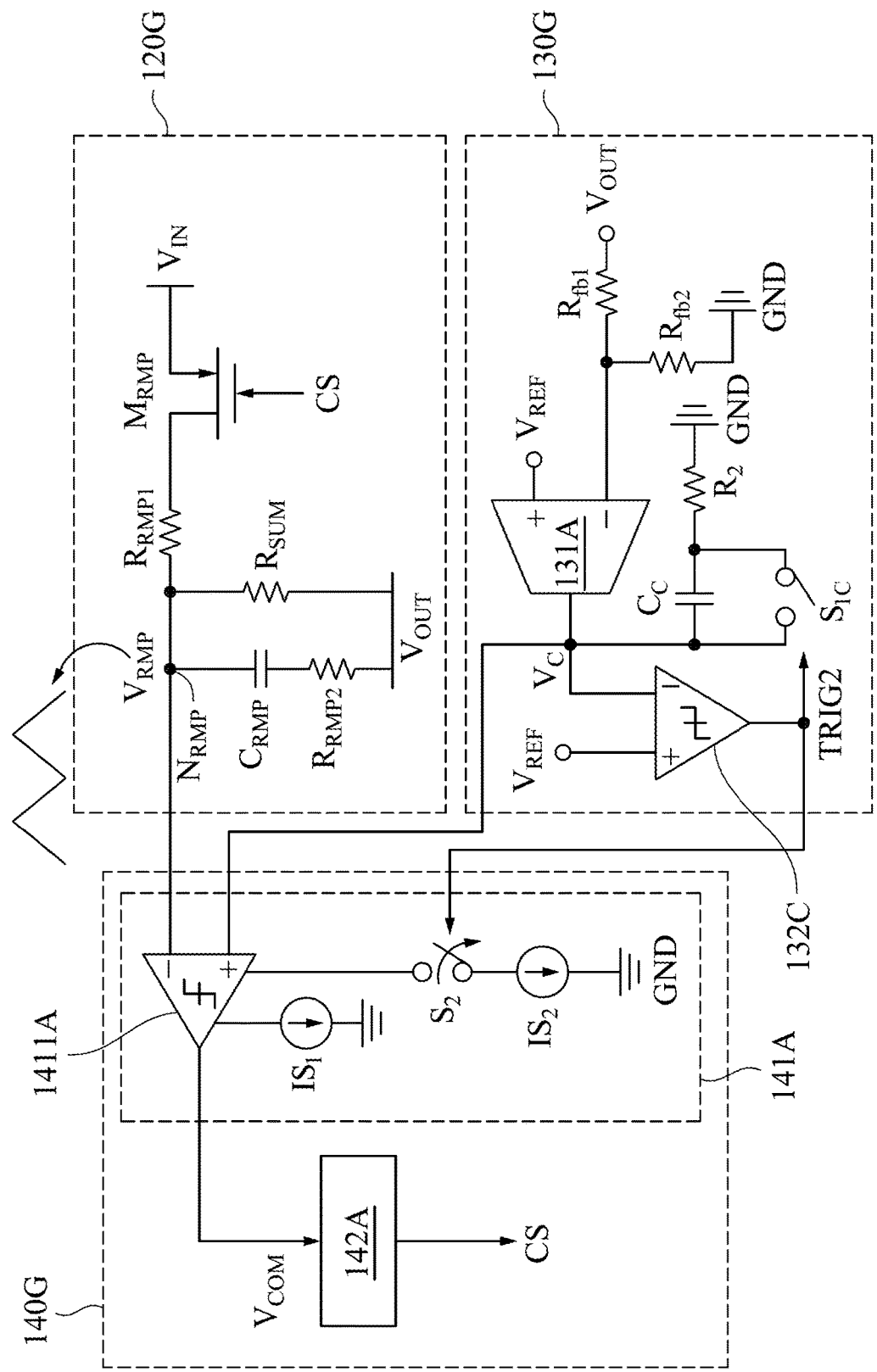
FIG. 8 is a schematic diagram illustrating a ramp generator circuit, a calculation circuit, and a control circuit according to some embodiments of the present disclosure.

Reference is made to FIG. 8. FIG. 8 is a schematic diagram illustrating a ramp generator circuit 120G, a calculation circuit 130G, and a control circuit 140G according to some embodiments of the present disclosure.

In some embodiments, the ramp generator circuit 120 in FIG. 1 is implemented by the ramp generator circuit 120G, the calculation circuit 130 in FIG. 1 is implemented by the calculation circuit 130G, and the control circuit 140 in FIG. 1 is implemented by the control circuit 140G.

The ramp generator circuit 120G is similar to the ramp generator circuit 120F in FIG. 7, and the control circuit 140G is similar to the control circuit 140F in FIG. 7. Further, one of major differences between the control circuit 140G in FIG. 8 and the control circuit 140F in FIG. 7 is that the switch $S_2$ in the control circuit 140G is controlled by the trigger signal TRIG2 from the comparator 132C.

The calculation circuit 130G is similar to the calculation circuit 130C in FIG. 4. One of major differences between the calculation circuit 130G in FIG. 8 and the calculation circuit 130C in FIG. 4 is that the calculation circuit 130G further includes a resistor $R_{fb1}$ and a resistor $R_{fb2}$. The resistor $R_{fb1}$ replaces the resistor $R_1$ in FIG. 4. In other words, the resistor $R_{fb1}$ is coupled to the second input terminal of the error amplifier 131A, and the error amplifier 131A receives the output signal $V_{OUT}$ through the resistor $R_{fb1}$. The resistor $R_{fb2}$ is coupled between the second input terminal of the error amplifier 131A and the ground terminal GND. In addition, another of major differences between the calculation circuit 130G in FIG. 8 and the calculation circuit 130C in FIG. 4 is that the resistor $R_2$ in FIG. 8 is coupled between the ground terminal GND and the capacitor $C_C$.

Figure 9:
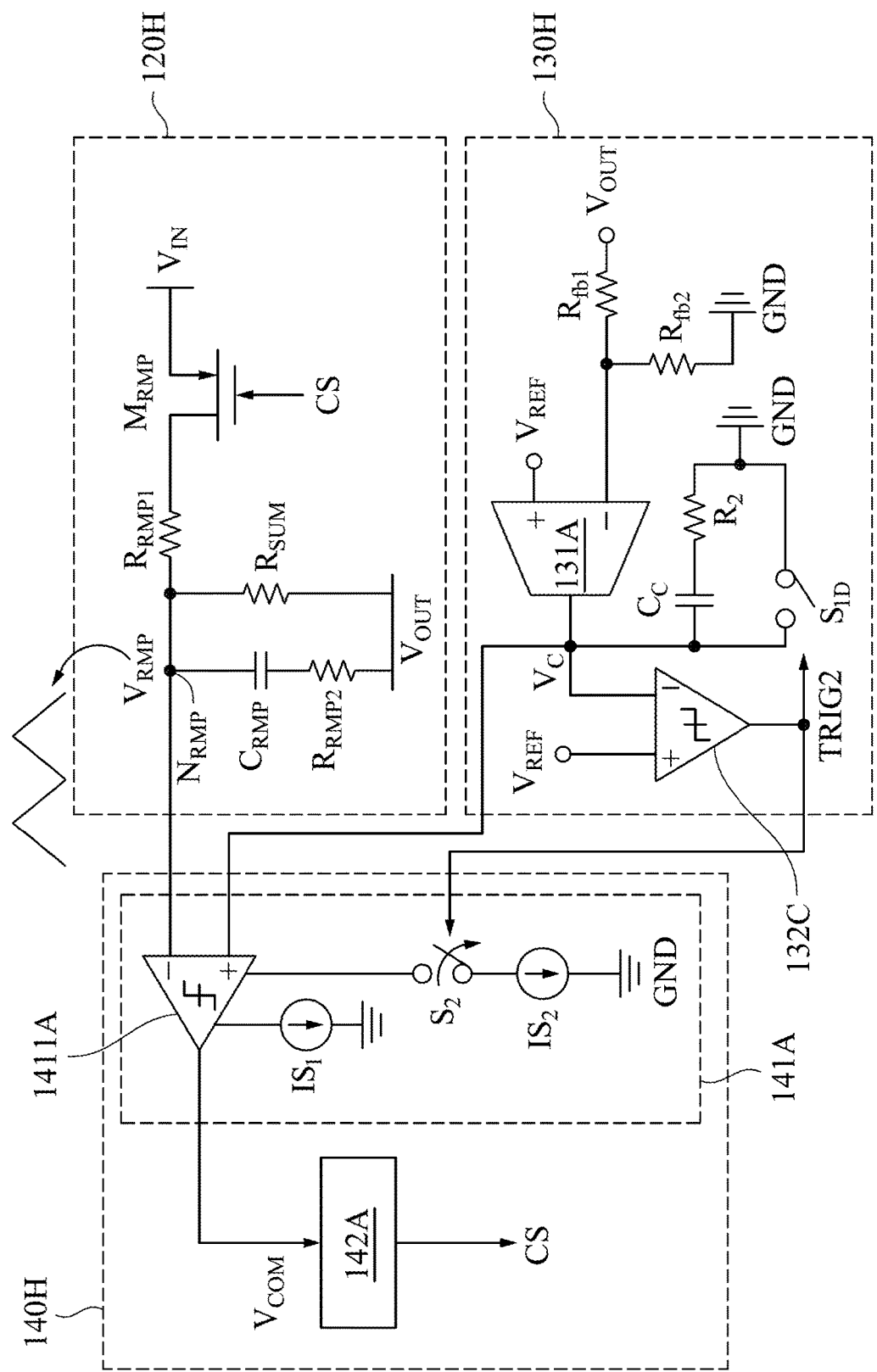
FIG. 9 is a schematic diagram illustrating a ramp generator circuit, a calculation circuit, and a control circuit according to some embodiments of the present disclosure.

Reference is made to FIG. 9. FIG. 9 is a schematic diagram illustrating a ramp generator circuit 120H, a calculation circuit 130H, and a control circuit 140H according to some embodiments of the present disclosure.

In some embodiments, the ramp generator circuit 120 in FIG. 1 is implemented by the ramp generator circuit 120H, the calculation circuit 130 in FIG. 1 is implemented by the calculation circuit 130H, and the control circuit 140 in FIG. 1 is implemented by the control circuit 140H.

The ramp generator circuit 120H is similar to the ramp generator circuit 120G in FIG. 8, and the control circuit 140H is similar to the control circuit 140G in FIG. 8.

The calculation circuit 130H is similar to the calculation circuit 130D in FIG. 5. One of major differences between the calculation circuit 130H in FIG. 9 and the calculation circuit 130D in FIG. 5 is that the calculation circuit 130H further includes a resistor $R_{fb1}$ and a resistor $R_{fb2}$. The resistor $R_{fb1}$ replaces the resistor $R_1$ in FIG. 5. In other words, the resistor $R_{fb1}$ is coupled to the second input terminal of the error amplifier 131A, and the error amplifier 131A receives the output signal $V_{OUT}$ through the resistor $R_{fb1}$. The resistor $R_{fb2}$ is coupled between the second input terminal of the error amplifier 131A and the ground terminal GND. In addition, another of major differences between the calculation circuit 130H in FIG. 9 and the calculation circuit 130D in FIG. 5 is that the resistor $R_2$ in FIG. 9 is coupled between the ground terminal GND and the capacitor $C_C$.

Figure 10:
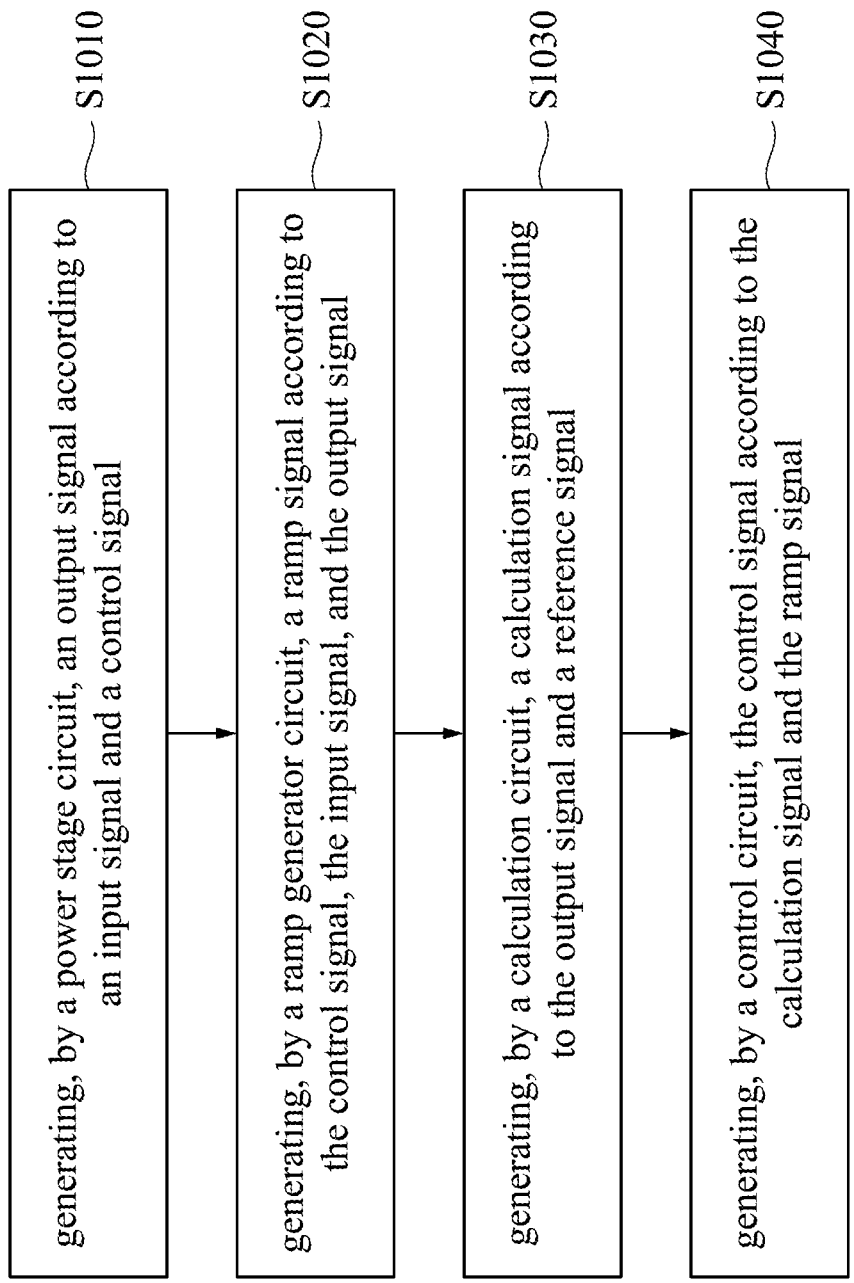
FIG. 10 is a flow diagram illustrating a converting method according to some embodiments of the present disclosure.

Reference is made to FIG. 10. FIG. 10 is a flow diagram illustrating a converting method 1000 according to some embodiments of the present disclosure. As illustrated in FIG. 10, the converting method 1000 includes operations S1010, S1020, S1030, and S1040.

In some embodiments, the converting method 1000 is implemented to the power converter 100 in FIG. 1, but the present disclosure is not limited thereto. For ease of understanding, the converting method 1000 is described with the power converter 100 in FIG. 1.

In operation S1010, the power stage circuit 110 generates the output signal $V_{OUT}$ according to the input signal $V_{IN}$ and the control signal CS. As described above, the output signal $V_{OUT}$ is substantially equal to a product of the input signal $V_{IN}$ and the duty cycle of the control signal CS.

In operation S1020, the ramp generator circuit 120 generates the ramp signal $V_{RMP}$ according to the control signal CS, the input signal $V_{IN}$, and the output signal $V_{OUT}$. The ramp generator circuit 120 can be implemented by the ramp generator circuit 120A in FIG. 2, but the present disclosure is not limited thereto.

In operation S1030, the calculation circuit 130 generates the calculation signal $V_C$ according to the output signal $V_{OUT}$ and the reference signal $V_{REF}$. The calculation circuit 130 can operate in the Inductor Current Discontinuous-Time Conduction Mode when the power converter 100 operates in the light loading state, and the calculation circuit 130 can operate in the Inductor Current Continuous-Time Conduction Mode when the power converter 100 operates in the normal state.

In operation S1040, the control circuit 140 generates the control signal CS according to the calculation signal $V_C$ and the ramp signal $V_{RMP}$. In some embodiments, the comparator circuit 141 generates the comparison signal $V_{COM}$ according to the calculation signal $V_C$ and the ramp signal $V_{RMP}$, and the control signal generator 142 generates the control signal CS according to the comparison signal $V_{COM}$.

Based on the descriptions above, the present disclosure can realize the seamless transition with a fast transition and without the aforementioned additional switching circuit to reduce the circuit cost and the circuit size.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power converter, comprising:
   a power stage circuit configured to generate an output signal according to an input signal and a control signal;
   a ramp generator circuit configured to generate a ramp signal according to the control signal, the input signal, and the output signal;
   a calculation circuit configured to generate a calculation signal according to the output signal and a reference signal, wherein the calculation circuit operates in a first mode when the power converter operates in a light loading state, and operates in a second mode when the power converter operates in a normal state, and wherein the calculation circuit comprises:
   an error amplifier comprising a first input terminal configured to receive the reference signal, a second input terminal configured to receive the output signal, and an output terminal;
   a capacitor having two terminals, wherein one of the two terminals is coupled to the output terminal of the error amplifier;
   a first switch coupled to the two terminals of the capacitor and configured to short the two terminals of the capacitor when the first switch is turned on;
   a first resistor, coupled to the second input terminal of the error amplifier, wherein the error amplifier receives the output signal via the first resistor; and
   a second resistor coupled between the other one of the two terminals of the capacitor and the second input terminal of the error amplifier, wherein the second resistor and the capacitor are coupled in series between the second input terminal of the error amplifier and the output terminal of the error amplifier; and
   a control circuit configured to generate the control signal according to the calculation signal and the ramp signal, wherein the control circuit comprises:
   a comparator circuit configured to generate a comparison signal according to the calculation signal and the ramp signal; and
   a control signal generator configured to generate the control signal according to the comparison signal.

2. The power converter of claim 1, wherein the comparator circuit comprises:
   a comparator configured to receive the ramp signal and the calculation signal;
   a first current source coupled to the comparator;
   a second current source coupled to a ground terminal; and
   a second switch coupled between the comparator and the second current source, wherein the second switch is turned off by a trigger signal when the power converter operates in the light loading state.

3. The power converter of claim 2, further comprising:
   a detector configured to detect a current in the power stage circuit to generate the trigger signal.

4. The power converter of claim 3, wherein the detector is a zero-crossing detector.

5. The power converter of claim 3, wherein the first switch is turned on by the trigger signal when the power converter operates in the light loading state to short two terminals of a resistor-capacitor circuit formed by the capacitor and the second resistor connected in series.

6. The power converter of claim 1, wherein the calculation circuit further comprises:
   a comparator configured to compare the calculation signal with the reference signal to generate a trigger signal.

7. The power converter of claim 6, wherein the first switch is turned on by the trigger signal when the power converter operates in the light loading state to short two terminals of a resistor-capacitor circuit formed by the capacitor and the second resistor connected in series.

8. A power converter, comprising:
   a power stage circuit configured to generate an output signal according to an input signal and a control signal;
   a ramp generator circuit configured to generate a ramp signal according to the control signal, the input signal, and the output signal;

a calculation circuit configured to generate a calculation signal according to the output signal and a reference signal, wherein the calculation circuit operates in a first mode when the power converter operates in a light loading state, and operates in a second mode when the power converter operates in a normal state, and wherein the calculation circuit comprises:
- an error amplifier comprising a first input terminal configured to receive the reference signal, a second input terminal configured to receive the output signal, and an output terminal;
- a capacitor having two terminals, wherein one of the two terminals is coupled to the output terminal of the error amplifier;
- a first switch coupled to the two terminals of the capacitor and configured to short the two terminals of the capacitor when the first switch is turned on, wherein the first switch is turned on by a trigger signal when the power converter operates in the light loading state;
- a first resistor, coupled to the second input terminal of the error amplifier, wherein the error amplifier receives the output signal via the first resistor;
- a second resistor coupled between the other one of the two terminals of the capacitor and a ground terminal; and
- a third resistor coupled between the second input terminal of the error amplifier and the ground terminal;

a control circuit configured to generate the control signal according to the calculation signal and the ramp signal, wherein the control circuit comprises:
- a comparator circuit configured to generate a comparison signal according to the calculation signal and the ramp signal; and
- a control signal generator configured to generate the control signal according to the comparison signal.

9. The power converter of claim 8, wherein the comparator circuit comprises:
- a comparator configured to receive the ramp signal and the calculation signal;
- a first current source coupled to the comparator;
- a second current source coupled to the ground terminal; and
- a second switch coupled between the comparator and the second current source, wherein the second switch is turned off by the trigger signal when the power converter operates in the light loading state.

10. The power converter of claim 9, further comprising:
a detector configured to detect a current in the power stage circuit to generate the trigger signal.

11. The power converter of claim 10, wherein the first switch is turned on by the trigger signal when the power converter operates in the light loading state to short two terminals of a resistor-capacitor circuit formed by the capacitor and the second resistor connected in series.

12. The power converter of claim 8, wherein the calculation circuit further comprises:
a comparator configured to compare the calculation signal with the reference signal to generate the trigger signal.

13. The power converter of claim 12, wherein the first switch is turned on by the trigger signal when the power converter operates in the light loading state to short two terminals of a resistor-capacitor circuit formed by the capacitor and the second resistor connected in series.

14. A converting method, comprising:
generating, by a power stage circuit, an output signal according to an input signal and a control signal;
generating, by a ramp generator circuit, a ramp signal according to the control signal, the input signal, and the output signal;
generating, by a calculation circuit, a calculation signal according to the output signal and a reference signal, wherein the calculation circuit operates in a first mode when a power converter operates in a light loading state, and operates in a second mode when the power converter operates in a normal state, and wherein the calculation circuit comprises:
- an error amplifier comprising a first input terminal configured to receive the reference signal, a second input terminal configured to receive the output signal, and an output terminal;
- a capacitor having two terminals, wherein one of the two terminals is coupled to the output terminal of the error amplifier;
- a first switch coupled to the two terminals of the capacitor and configured to short the two terminals of the capacitor when the first switch is turned on;
- a first resistor, coupled to the second input terminal of the error amplifier, wherein the error amplifier receives the output signal via the first resistor; and
- a second resistor coupled between the other one of the two terminals of the capacitor and the second input terminal of the error amplifier, wherein the second resistor and the capacitor are coupled in series between the second input terminal of the error amplifier and the output terminal of the error amplifier; and generating, by a control circuit, the control signal according to the calculation signal and the ramp signal, comprising:
- generating, by a comparator circuit of the control circuit, a comparison signal according to the calculation signal and the ramp signal; and
- generating, by a control signal generator of the control circuit, the control signal according to the comparison signal.

15. A converting method, comprising:
generating, by a power stage circuit, an output signal according to an input signal and a control signal;
generating, by a ramp generator circuit, a ramp signal according to the control signal, the input signal, and the output signal;
generating, by a calculation circuit, a calculation signal according to the output signal and a reference signal, wherein the calculation circuit operates in a first mode when a power converter operates in a light loading state, and operates in a second mode when the power converter operates in a normal state, and wherein the calculation circuit comprises:
- an error amplifier comprising a first input terminal configured to receive the reference signal, a second input terminal configured to receive the output signal, and an output terminal;
- a capacitor having two terminals, wherein one of the two terminals is coupled to the output terminal of the error amplifier; and
- a first switch coupled to the two terminals of the capacitor and configured to short the two terminals of the capacitor when the first switch is turned on, wherein the first switch is turned on by a trigger signal when the power converter operates in the light loading state;

a first resistor, coupled to the second input terminal of the error amplifier, wherein the error amplifier receives the output signal via the first resistor;

a second resistor coupled between the other one of the two terminals of the capacitor and a ground terminal; and a third resistor coupled between the second input terminal of the error amplifier and the ground terminal; and generating, by a control circuit, the control signal according to the calculation signal and the ramp signal, comprising:

generating, by a comparator circuit of the control circuit, a comparison signal according to the calculation signal and the ramp signal; and generating, by a control signal generator of the control circuit, the control signal according to the comparison signal.

\* \* \* \* \*